Patented Mar. 21, 1950

2,501,409

UNITED STATES PATENT OFFICE 2,501,409

PRODUCT FOR SUPPLEMENTING VITAMINS AND METHOD FOR PREPARING THE SAME

Adolf Rosenberg, New York, N. Y.

No Drawing. Application September 26, 1944, Serial No. 555,886

9 Claims. (Cl. 99—2)

This invention relates to a product for supplementing the vitamin content of animal feeds and is particularly directed to an improved composition of high nutritional value embodying vitamins.

It is generally customary to use as products for supplementing the vitamin content of animal feeds compositions prepared from sardine oil, menhaden oil, tuna oil and the like as vehicles for carrying fish oil concentrates of vitamins A and D. These combinations of fish oils and the vitamin concentrates are called "feeding oils." There have also been used syrups and other heavy bodied vehicles such as molasses as carriers of the fish liver oil vitamin concentrates. The feeding oils are not water soluble and therefore cannot be diluted by the stock man or the feed manufacturer with feeding milk, water, or other aqueous liquids. A sardine oil feeding oil is not a free flowing material. The feeding oils sometimes impart undesirable tastes and odors to the flesh of animals and even to eggs. These undesirable characteristics render these nutrients unpalatable to man. The heavy bodied syrups and the like containing vitamins A and D are objectionable because their high viscosity makes it difficult to manipulate them. They cannot easily be distributed uniformly in mashes and other feeds. At low temperatures their viscosity is increased to such an extent that they become considerably more difficult to handle. In the winter when there exists the greatest need for vitamin A and D supplementation, this increased viscosity is especially disadvantageous for the farmer and the feed dealer. Some of the feeding oils also have a similar disadvantage in that they are highly viscous and even freeze in the winter.

Stockmen and feed manufacturers as a rule do not have facilities for storing their supplies of these compositions at temperatures which will assure ready fluidity thereof. If portions of such compositions are removed from their containers in order to be heated, such transfer and warming imposes additional labor and furthermore causes possible loss of vitamin potency.

I have found that a remarkably efficacious water soluble vitamin A and D feed product may be prepared from condensed molasses distiller's solubles by forming an emulsion thereof with oleaginous material containing oil soluble vitamins. This condensed molasses distiller's solubles is a concentrated stillage obtained from the ethyl alcohol yeast-fermentation of cane molasses in which all of the living yeast cells have been destroyed. The aforesaid emulsion made from oleaginous materials such as fish liver oils carrying vitamins A and D is a limpid easy flowing liquid of great stability and palatability.

It is accordingly an object of this invention to provide a free flowing emulsion containing oil soluble vitamins having great fluidity at low temperatures.

It is another object of this invention to provide an emulsion containing oil soluble vitamins which freeze only at about —20° C. or lower.

It is another object of this invention to provide an emulsion containing oil soluble vitamins having great stability which does not break down after freezing.

Another object of the invention is to provide an emulsion containing oil soluble vitamins of such character that the vitamins A and D are preserved against diminution in potency.

Another object of the invention is to provide an emulsion containing oil soluble vitamins of great palatability which does not impart undesirable tastes and odors to flesh of animals or to eggs.

Another object of the invention is to provide an emulsion containing oil soluble vitamins as well as minerals and some members of the vitamin B and G complexes.

Another object of the invention is to provide an emulsion containing oil soluble vitamins which can be prepared with substantial economies in manufacturing costs.

As an illustration of the means whereby the foregoing and other objects of the invention can be effectuated, the following example is presented.

First I take about 200 parts by weight of the liquid condensed molasses distiller's solubles, heat to a temperature of approximately 200° F. and gradually add thereto while continuously stirring from 16 to 24 parts by weight of gums such as gum tragacanth, karaya gum, gum arabic and the like or synthetic emulsifying agents. After the gum has been added, the mixture is thoroughly stirred until it attains a jelly-like consistency. Then to about 1200 parts of liquid condensed molasses distiller's solubles I add the aforesaid jelly and thoroughly mix the same for a period of four to six hours. Thereafter, I add to this mixture about 600 parts by weight of fish liver oils. The vitamin A and D potency of the finished product will depend upon the concentration of these vitamins in the fish oils.

The mixture of condensed molasses solubles, the jelly aforesaid and the vitamin-bearing oils is then agitated for about twelve hours. During the course of the agitation, care is taken to prevent air from being sucked into the liquid in order to avoid its oxidative or other deleterious action. When the agitation of the mixture is completed, the liquid is strained at room temperature. The filtrate is then passed through a homogenizer to produce a limpid free flowing emulsion.

This liquid is a thoroughly stable emulsion and possesses an unusual ability to withstand low temperatures. I have found that even when this emulsion is frozen, the freezing point being in the neighborhood of −20° C., it may readily be returned to the liquid state without showing any evidence of a breakdown of the emulsion.

It will be appreciated that such characteristics are particularly valuable for the stockman whose storage facilities are not provided with heating means. This invention provides a product which can readily be measured out and distributed evenly in feeding the stock. It also minimizes the danger of breakdown of the emulsion, as frequently occurs with the products currently used, when the containers are stored in unheated quarters.

This product has a markedly improved palatability and does not impart objectionable tastes and odors to the flesh of animals or to eggs. Its vitamin A and D content is preserved, so that the vitamin potency thereof does not deteriorate during storage. The product may be prepared from relatively low priced starting materials, thereby resulting in substantial manufacturing economies. Furthermore, this product possesses nutritional value by the presence of proteins, minerals and members of the vitamin B and G complexes occurring in the condensed molasses distiller's solubles.

I claim:

1. An improved product for supplementing the vitamin content of animal feeds comprising: an emulsion comprising a concentrated stillage obtained from the ethyl alcohol yeast-fermentation of cane molasses in which all of the living yeast cells have been destroyed, and an oil solution of oil soluble vitamins.

2. An improved product for supplementing the vitamin content of animal feeds comprising: an emulsion comprising liquid condensed molasses distiller's solubles, and an oil solution of oil soluble vitamins.

3. An improved product for supplementing the vitamin content of animal feeds comprising: an emulsion comprising liquid condensed molasses distiller's solubles, an oil solution of vitamin A and vitamin D.

4. Process of preparing an improved product for supplementing the vitamin content of animal feeds which comprises: homogenizing an oleaginous material containing oil soluble vitamins in a liquid condensed molasses distiller's solubles.

5. Process of preparing an improved product for supplementing the vitamin content of animal feeds which comprises: forming first, a jelly of condensed molasses distiller's solubles with a gum; second, mixing said jelly with liquid condensed molasses distiller's solubles; and homogenizing said mixture.

6. Process of preparing an improved product for supplementing the vitamin content of animal feeds which comprises: forming first, a jelly of condensed molasses distiller's solubles with a gum of the class consisting of gum tragacanth, gum arabic and karaya gum; second, mixing said jelly with a liquid condensed distiller's solubles; and homogenizing said mixture.

7. An improved product for supplementing the vitamin content of animal feeds comprising: an emulsion comprising about seven parts of concentrated stillage obtained from the ethyl alcohol yeast-fermentation of cane molasses in which all of the living yeast cells have been destroyed, and about three parts of an oil solution of oil soluble vitamins.

8. An improved product for supplementing the vitamin content of animal feeds comprising: an emulsion comprising about seven parts of liquid condensed molasses distiller's solubles, and about three parts of an oil solution of oil soluble vitamins.

9. An improved product for supplementing the vitamin content of animal feeds comprising: an emulsion comprising about seven parts of liquid condensed molasses distiller's solubles, and about three parts of an oil solution of vitamin A and vitamin D.

ADOLF ROSENBERG.

REFERENCES CITED

The following references are of record in the file of this patent:

UNITED STATES PATENTS

| Number | Name | Date |
|---|---|---|
| 1,122,294 | Miwa | Dec. 29, 1914 |
| 1,752,176 | Halton | Mar. 25, 1930 |
| 1,845,370 | Wagner | Feb. 16, 1932 |
| 1,921,991 | Hildebrandt | Aug. 8, 1933 |
| 2,022,464 | Hall | Nov. 26, 1935 |
| 2,098,998 | Brinton | Nov. 16, 1937 |
| 2,202,161 | Miner | May 28, 1940 |
| 2,321,400 | Lubarsky | June 8, 1943 |
| 2,356,350 | Peters et al. | Aug. 22, 1944 |